US011618862B2

(12) United States Patent
Riebel et al.

(10) Patent No.: US 11,618,862 B2
(45) Date of Patent: Apr. 4, 2023

(54) ORGANIC MONOLIGNOL BIOPOLYMER IMPREGNATED WOOD PARTICLE BRIQUETTES/PELLETS AND METHOD OF MAKING

(71) Applicant: Comstock IP Holdings LLC, Milton, GA (US)

(72) Inventors: Milton J. Riebel, Mankato, MN (US); Michael J. Riebel, Mankato, MN (US)

(73) Assignee: Comstock IP Holdings LLC, Milton, GA (US)

( * ) Notice: Subject to any disclaimer, the term of this patent is extended or adjusted under 35 U.S.C. 154(b) by 0 days.

(21) Appl. No.: 17/349,587

(22) Filed: Jun. 16, 2021

(65) Prior Publication Data

US 2022/0403275 A1 Dec. 22, 2022

(51) Int. Cl.
*C10L 5/44* (2006.01)
*C10L 5/36* (2006.01)
*C10L 5/06* (2006.01)

(52) U.S. Cl.
CPC .............. *C10L 5/442* (2013.01); *C10L 5/06* (2013.01); *C10L 5/361* (2013.01); *C10L 5/363* (2013.01);
(Continued)

(58) Field of Classification Search
CPC .......... C10L 5/442; C10L 5/361; C10L 5/363; C10L 5/06; C10L 2270/08;
(Continued)

(56) References Cited

U.S. PATENT DOCUMENTS 7,601,858 B2  10/2009 Cantrell et al.
7,608,729 B2  10/2009 Winsness et al.
(Continued)

FOREIGN PATENT DOCUMENTS

AU  2005277579  3/2007
AU  2007217109  9/2008
(Continued)

OTHER PUBLICATIONS

Winsness, David, et al.; U.S. Appl. No. 60/602,050, filed Aug. 17, 2004.
(Continued)

*Primary Examiner* — Cephia D Toomer
(74) *Attorney, Agent, or Firm* — Dunlap Codding, P.C.

(57) ABSTRACT

A charcoal replacement solid energy fuel comprises wood particles substantially fully impregnated with a melt-flowable, natural, monolignol biopolymer derived from biomass which can be further processed into various shapes of briquettes, pellets and other shapes for grilling, heating/cooking, green coal energy and other applications. The material and its method of making are environmentally friendly, carbon neutral, and lower cost alternative to charcoal or traditional coal. The melt-flowable monolignol based material impregnated into the wood imparts significant water resistance, UV resistance, antimicrobial functionality, faster lighting and higher BTU/lb energy without the need to add carbonize wood or coal. The impregnated wood granules or particles can then be compressed, without the need for additional binder, into various homogenous charcoal briquette replacements, pellets, or shapes for grilling or green coal energy fuel.

25 Claims, 5 Drawing Sheets

(52) U.S. Cl.
CPC ....... *C10L 2250/04* (2013.01); *C10L 2270/08* (2013.01); *C10L 2290/08* (2013.01); *C10L 2290/22* (2013.01); *C10L 2290/28* (2013.01); *C10L 2290/30* (2013.01)

(58) Field of Classification Search
CPC ............. C10L 2290/22; C10L 2290/28; C10L 2290/30; C10L 2250/04; C10L 2290/08
See application file for complete search history.

(56) References Cited

U.S. PATENT DOCUMENTS

| | | | |
|---|---|---|---|
| 7,937,850 | B2 | 5/2011 | Tate et al. |
| 8,008,516 | B2 | 8/2011 | Cantrell et al. |
| 8,008,517 | B2 | 8/2011 | Cantrell et al. |
| 8,168,037 | B2 | 5/2012 | Winsness |
| 8,256,134 | B2 | 9/2012 | Rehkopf et al. |
| 8,283,484 | B2 | 10/2012 | Cantrell et al. |
| 8,449,986 | B2 | 5/2013 | Riebel et al. |
| 8,598,256 | B2 | 12/2013 | Riebel et al. |
| 8,679,353 | B2 | 3/2014 | Winsness |
| 8,697,156 | B2 | 4/2014 | Tate et al. |
| 8,765,827 | B2 | 7/2014 | Riebel et al. |
| 8,772,379 | B2 | 7/2014 | Riebel et al. |
| 8,809,425 | B2 | 8/2014 | Riebel et al. |
| 8,835,285 | B2 | 9/2014 | Grimes et al. |
| 9,012,668 | B2 | 4/2015 | Winsness |
| 9,034,954 | B2 | 5/2015 | Riebel et al. |
| 9,108,140 | B2 | 8/2015 | Winsness |
| 9,139,627 | B2 | 9/2015 | Riebel |
| 9,163,142 | B2 | 10/2015 | Riebel et al. |
| 9,212,334 | B2 | 12/2015 | Cantrell et al. |
| 9,320,990 | B2 | 4/2016 | Winsness |
| 9,346,955 | B2 | 5/2016 | Riebel et al. |
| 9,365,525 | B2 | 6/2016 | Manesh et al. |
| 9,382,283 | B2 | 7/2016 | Manesh et al. |
| 9,394,623 | B2 | 7/2016 | Grimes et al. |
| 9,439,440 | B2 | 9/2016 | Riebel et al. |
| 9,587,098 | B2 | 3/2017 | Riebel et al. |
| 9,587,099 | B2 | 3/2017 | Riebel et al. |
| 9,711,670 | B2 | 7/2017 | Grimes et al. |
| 10,655,083 | B2 | 5/2020 | Cantrell et al. |
| 10,735,657 | B2 | 8/2020 | Kitayama et al. |
| 2009/0250412 | A1 | 10/2009 | Winsness et al. |
| 2009/0259060 | A1 | 10/2009 | Cantrell et al. |
| 2012/0291306 | A1 | 11/2012 | Rehkopf et al. |
| 2013/0206336 | A1 | 8/2013 | Riebel et al. |
| 2013/0206342 | A1 | 8/2013 | Dahmes et al. |
| 2017/0253805 | A1 | 9/2017 | Cernohous et al. |
| 2018/0072889 | A1* | 3/2018 | Ying .................. C08L 23/06 |
| 2019/0062508 | A1 | 2/2019 | Winsness et al. |
| 2019/0381476 | A1 | 12/2019 | Grimes et al. |
| 2019/0386105 | A1 | 12/2019 | Grimes et al. |
| 2020/0335647 | A1 | 10/2020 | Grimes et al. |
| 2021/0163745 | A1 | 6/2021 | Riebel et al. |
| 2021/0221960 | A1 | 7/2021 | Winsness et al. |
| 2021/0292968 | A1 | 9/2021 | Manesh et al. |
| 2022/0162512 | A1* | 5/2022 | Hagen .................. C10L 5/363 |

FOREIGN PATENT DOCUMENTS

| | | |
|---|---|---|
| BR | PI0707942 | 2/2007 |
| BR | PI0514479 | 6/2008 |
| BR | 1120140202001 | 6/2017 |
| BR | 1120140202010 | 6/2017 |
| BR | 1120140202028 | 9/2019 |
| BR | 1120200041980 | 9/2020 |
| CA | 2576895 | 3/2006 |
| CA | 2642838 | 8/2007 |
| CA | 2864460 | 8/2013 |
| CA | 2864720 | 8/2013 |
| CA | 2864732 | 8/2013 |
| CA | 3110458 | 3/2019 |
| CN | 101014557 | 8/2007 |
| EP | 1778608 | 5/2007 |
| EP | 1996685 | 3/2008 |
| EP | 2814936 | 12/2014 |
| EP | 2814937 | 12/2014 |
| EP | 2814938 | 12/2014 |
| EP | 3676314 | 7/2020 |
| ID | 047.3268 | 8/2007 |
| IN | 1194/DELNP/2007 | 4/2007 |
| MX | MX/A/2007/002001 | 2/2008 |
| WO | WO/2006/023432 | 3/2006 |
| WO | WO/2006/099456 | 9/2006 |
| WO | WO/2007/098396 | 8/2007 |
| WO | WO/2013/028734 | 2/2013 |
| WO | WO/2013/123397 | 8/2013 |
| WO | WO/2013/123400 | 8/2013 |
| WO | WO/2013/123406 | 8/2013 |
| WO | WO/2014/028698 | 2/2014 |
| WO | WO/2014/042907 | 3/2014 |
| WO | WO/2016/022560 | 2/2016 |
| WO | WO/2016/054132 | 4/2016 |
| WO | WO/2019/046704 | 3/2019 |
| WO | WO/2019/246175 | 12/2019 |
| WO | WO/2019/246186 | 12/2019 |
| WO | WO/2019/246205 | 12/2019 |
| WO | WO/2019/246224 | 12/2019 |

OTHER PUBLICATIONS

Winsness, David, et al.; U.S. Appl. No. 60/661,733, filed Mar. 15, 2005.
Winsness, David, et al.; U.S. Appl. No. 60/773,947, filed Feb. 16, 2006.
Tate, Jeffrey et al.; U.S. Appl. No. 60/937,073, filed Jun. 25, 2007.
Tate, Jeffrey, et al.; U.S. Appl. No. 61/068,191, filed Mar. 5, 2008.
Riebel, Michael; U.S. Appl. No. 61/053,196, filed May 14, 2008.
Feng, Xinjian, et al.; U.S. Appl. No. 61/525,926, filed Aug. 22, 2011.
Riebel, Michael et al.; U.S. Appl. No. 61/599,215, filed Feb. 15, 2012.
Riebel, Michael, et al.; U.S. Appl. No. 61/614,862, filed Mar. 23, 2012.
Riebel, Michael, et al.; U.S. Appl. No. 61/683,333, filed Aug. 15, 2012.
Grimes. Craig, et al.; U.S. Appl. No. 61/695,485, filed Aug. 31, 2012.
Grimes, Craig, et al.; U.S. Appl. No. 61/792,783, filed Mar. 15, 2013.
Cernohous, Jeffrey, et al.; U.S. Appl. No. 62/033,005, filed Aug. 4, 2014.
Winsness, David, et al.; U.S. Appl. No. 62/057,641, filed Sep. 30, 2014.
Winsness, David, et al.; U.S. Appl. No. 62/552,468, filed Aug. 31, 2017.
Grimes, Craig, et al.; U.S. Appl. No. 62/686,908, filed Jun. 19, 2018.
Grimes, Craig, et al.; U.S. Appl. No. 62/686,815, filed Jun. 19, 2018.
Grimes, Craig, et al.; U.S. Appl. No. 62/686,832, filed Jun. 19, 2018.
Grimes, Craig, et al.; U.S. Appl. No. 62/686,876, filed Jun. 19, 2018.
Riebel, Michael, et al.; U.S. Appl. No. 62/889,367, filed Aug. 20, 2019.
Manesh, Ali et al.; U.S. Appl. No. 62/934,840, filed Nov. 13, 2019.
Montgomery, Robert, et al.; U.S. Appl. No. 62/961,470, filed Jan. 15, 2020.
Riebel, Michael, et al.; U.S. Appl. No. 62/961,849, filed Jan. 16, 2020.
Riebel, Michael, et al.; U.S. Appl. No. 63/039,528, filed Jun. 16, 2020.
Grimes, Craig et al.; U.S. Appl. No. 16/445,534, filed Jun. 19, 2019.
Montgomery, Robert, et al.; U.S. Appl. No. 17/148,513, filed Jan. 15, 2021.
ATTIS IP LLC; U.S. Appl. No. 17/216,531, filed Mar. 29, 2021.
Grimes, Craig, et al.; U.S. Appl. No. 63/193,458, filed May 26, 2021.
Grimes, Craig, et al.; U.S. Appl. No. 63/193,826, filed May 27, 2021.
Grimes, Craig; U.S. Appl. No. 63/193,803, filed May 27, 2021.

(56) References Cited

OTHER PUBLICATIONS

Grimes, Craig, et al.; U.S. Appl. No. 63/193,809, filed May 27, 2021.

* cited by examiner

ORGANIC MONOLIGNOL BIOPOLYMER IMPREGNATED WOOD PARTICLE BRIQUETTES/PELLETS AND METHOD OF MAKING

BACKGROUND OF THE INVENTIVE CONCEPTS

1. Field of the Inventive Concepts

The present disclosure relates to the field of providing environmentally friendly, carbon neutral, and lower cost alternatives to charcoal and/or traditional coal and, more particularly, to impregnated wood particulate comprising a melt-flowable lignin extract.

2. Brief Description of Related Art

Traditionally, common charcoal briquettes have been used in homes to provide a method by which to cook food outside at festive occasions. Charcoal or biochar is also being used for "green coal" or bio-coal fuel for grilling and energy generation, as a more environmentally friendly alternative and carbon neutral fuel to replace mined coal. Charcoal or "green coal" requires carbonization of various biomass which requires significant energy inputs and costs to achieve a required high BTU material.

Charcoal heating materials, such as charcoal briquettes, are commonly used for cooking food. Foods cooked with charcoal can have a unique flavor and have wide appeal. Conventional charcoal briquettes generally provide a slow-burning fuel with a high BTU output.

Commonly known charcoal products such as product sold under the KINGSFORD brand are comprised of petroleum-based coal, pyrolyzed or carbonized wood, lime, clay, corn starch, and borax. In addition, a percentage of various white hardwoods can be added to enhance flavor. Ingredients other than carbonized wood can create undesired flavors, emissions and reduction in overall energy.

Conventional charcoal also has various shortcomings such as sulfur emissions and taste from the coal, and the briquettes can be difficult to ignite and may not continue to burn, even after they appear to have been ignited. To address this problem, conventional charcoal manufacturers often spray the briquettes with a petroleum solvent to create "easy-to-light" briquettes. More commonly, a consumer will use lighter fluid to ignite the briquettes. Excess use of such flammable petroleum-based materials, however, may impart unwanted flavors and chemicals to the food. Additionally, the use of lighter fluid can emit volatile organic compounds (VOCs), which can have adverse short and/or long-term health effects.

The charcoal briquette was first invented and patented by Ellsworth B. A. Zwoyer of Pennsylvania in 1897 and was produced by the Zwoyer Fuel Company. The process was further popularized by Henry Ford, who used wood and sawdust byproducts from automobile fabrication as a feedstock. Ford Charcoal went on to become the Kingsford Company.

Other forms of charcoal include 1) lump charcoal made directly from hardwood materials, 2) Japanese charcoal wherein the acids are removed to reduce the smokiness, 3) extruded charcoal made from raw and carbonized wood which is extruded under high heat conditions, and 4) the most commonly used pillow charcoal comprising sawdust, carbonized wood, coal, starch, borax, lime and other additives. Kingsford Charcoal is best known for this recipe and pillow shape.

Charcoal briquette patents date back to the early 1900's. U.S. Pat. No. 729,149 titled Machine for Making Artificial-Fuel Briquettes discusses the basic process to form a briquette shape. Various prior art discloses making charcoal with carbonized wood or combinations of carbonized wood, coal and additives. More recent US patents describe various quick lighting fluids such as that in U.S. Pat. No. 8,728,178 to Moe et al. using n-butanol and biodiesel as replacement lighter fluid for charcoal briquettes.

Conventional charcoal comprises pyrolyzed or carbonized wood and can also include coal along with many other ingredients and binders that are detrimental to its burning characteristics, lighting ability and flavor. Binders such as required by prior art charcoal, typically comprise corn starch, calcium carbonate (lime) and BORAX™, and these binders detract from the taste of the food during grilling and reduce the overall BTU/lb energy for bio-coal applications.

Because most charcoal briquettes include coal and other undesired additives, the market is starting to see various forms of all-natural charcoal briquettes for grilling wherein wood is carbonized and made into briquettes using a natural binder. Carbonization of wood has various problems including dealing with the various gases and oils that are removed from wood during this process. In addition, typically this process sees a yield loss great than 60% of the starting biomass. Thus, the yield loss and high-energy requirements makes this charcoal a higher cost material.

Another limitation of producing charcoal is dealing with water and the removal of water. The blends of ingredients for charcoal are typically dry. Then water is added, typically over 40% by weight of the starting dry mix, to support the briquetting process. Typically, the wet briquette then requires drying from approximately 35% moisture content down to about 5% moisture content and that requires significant energy input. Thus, there is a need to reduce the energy required for carbonization and water removal and to reduce the cost of various expensive additives, thereby providing a better lower cost all-natural charcoal replacement.

For example, charcoal briquettes comprising carbonized wood or blends of carbonized wood and coal all require binders. The most common binders are cornstarch or blends of cornstarch with clay or lime (calcium carbonate). Cornstarch is becoming increasingly expensive and has negative effect on flavor, thus various companies has looked to clay or similar materials. However, these alternative binders generally exhibit inadequate binding strength and results in a lack of structural integrity. Most of all, binders do not add to the flavor and in most cases are negative to the flavor profile and reduce the overall energy content of the product in BTU/lb. Further, these binders must be blended in an aqueous state, thus greatly increasing the water content of the charcoal admixture to provide for the briquetting process.

Briquetting or pelleting white wood alone does not provide for a sufficient charcoal briquette because of low BTU and other limiting issues, thus charcoal briquettes require carbonized wood and the optional addition of coal to create the heat required. Wood pellets typically have a BTU/lb between 7,000 to 8,000, whereas charcoal or coal are above 10,000 BTU/lb, thus carbonization is required to increase the BTU/lb to this level, but at a significant added cost, emission issues, and with a yield loss typically greater than 60%.

There is a demand for a new form of grilling fuel without coal, the grilling fuel having improved flavor and physical characteristics, improved water resistance, higher BTU, and availability in various forms. For example, a charcoal alternative having 100% natural biomass components without the need for carbonizing wood, and without the addition of binder, coal, and other chemicals that are used in today's charcoal would be highly desirable. It is additionally desirable for such a charcoal alternative to have improved moisture/water resistance, improved lighting, high BTU, wider range of densities and shapes, improved flavor profile, and lower cost of materials/processing There is also demand for new forms of biobased coal to replace petrochemical coal, wherein the biobased coal is carbon neutral, provides high BTU/lb, and has high density for shipping to new green power plants to replace coal.

SUMMARY OF THE INVENTIVE CONCEPTS

The inventive concepts disclosed and claimed herein relate generally to a charcoal replacement solid energy fuel. In one embodiment, an impregnated wood material comprises wood particulate and a melt-flowable lignin extract, wherein the melt-flowable lignin extract substantially fully impregnates the wood particulate.

In another embodiment, a charcoal replacement fuel comprises wood particulate and a melt-flowable lignin extract, wherein the melt-flowable lignin extract substantially fully impregnates the wood particulate. The impregnated wood particulate is compressed into a shaped article such as a molded briquette or pellet.

In another embodiment, a method of making wood particulate impregnated with a melt flowable monolignal based natural polymer comprises the following steps. A monolignol biopolymer is ground into a granular or powder form. Wood is dried and ground into a granular or wood flour form. The wood is the fused and impregnated with the monolignol biopolymer using heat, pressure, kneading or a combination thereof, wherein the temperature is above 300° F. Such processing created a substantially fully impregnated granular composite material which can then be cooled. The fully impregnated granular composite material is optionally formed into a charcoal briquette or pellet replacement fuel.

In another embodiment, a solid energy fuel comprises a monolignol biopolymer and white wood particulate, wherein the white wood particulate is substantially fully impregnated with the monolignol biopolymer.

In yet another embodiment, an improved charcoal comprises wood particles substantially fully impregnated with a monolignol biopolymer. The impregnated wood particles are blended with a dry mix of conventional charcoal material, whereby the impregnated wood particles replace a binder or additive component in the conventional charcoal material.

Wood particles substantially fully impregnated with a melt-flowable, all natural, monolignol biopolymer derived solely from biomass, can be further processed into various shapes of briquettes, pellets and various other shapes for grilling, heating/cooking, green coal energy and other applications. The material and its method of making are environmentally friendly, carbon neutral, and provide a low-cost alternative to charcoal or traditional coal.

In yet another embodiment, wood particulate or granules are substantially fully impregnated with a melt-flowable monolignol based material to impart a high degree of water resistance, UV resistance, antimicrobial functionality, faster lighting and higher BTU/lb energy without the need to add carbonize wood or coal. The impregnated wood granules or particles can then be compressed, without the need for an additional binder, into various homogenous charcoal briquette replacements, pellets, or shapes for grilling or green coal energy fuel.

Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "a monolignol-acrylate" includes a plurality or mixture of fibers, plastics, materials and so forth.

Unless otherwise indicated, all numbers expressing quantities of size (e.g., length, width, diameter, thickness), volume, mass, force, strain, stress, time, temperature or other conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or 0" includes A, B, C, and D individually, but also includes any and all combinations and sub combinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

The phrase "substantially fully impregnated" is used herein to mean that at least 80% of the pore volume of the particulate is filled.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF THE INVENTION

The presently disclosed subject matter will now be described more fully hereinafter with reference to the accompanying Examples and Drawings, in which representative embodiments are shown. The presently disclosed subject matter can, however, be embodied in different forms and should not be construed as limited to the embodiments set forth herein, Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Before describing the present invention in detail, it is to be understood that all publications, patents and patent applications cited herein, whether supra or infra, are hereby incorporated by reference in their entirety to the same extent as if each individual publication, patent or patent application was specifically and individually indicated to be incorporated by reference in its entirety.

It must be noted that, as used in this specification and the appended claims, the singular forms "a," "an" and "the" include plural referents unless the content clearly dictates otherwise. Thus, for example, reference to an "additive" includes two or more such additives.

Unless otherwise stated, amounts listed in percentage ("%'s" are in weight percent.)

The presently disclosed and claimed inventive concepts provide a novel alternative to charcoal and coal fuel heating material to provide various improvements of functionality and process over conventional charcoal at a lower cost of materials and lower energy inputs. Improved functionality can include quicker lighting, greatly improved moisture and water resistance, improved density, ability to self-bind into pellets or briquettes, improves energy in BTU/lb, and elimination of some or all carbonized wood and binders. This alternative charcoal can be used for cooking, grilling and as a replacement for solid fuel used in energy production.

Typically charcoal requires carbonization of wood or mineral or a blend of both in addition to petrochemical coal and binders. New types of charcoal are now being produced using all carbonized or pyrolyzed wood to remove the coal from charcoals. However, these applications still require significant energy inputs and separate binder materials that detract from taste, energy, and can create emissions problems.

Previous research has used a melt-flowable lignin extract with wood to act has an adhesive binder; however, the low levels previously used created a highly sticky surface that could not be processed into a standard briquette. These prior art methods only partially coat and bind the wood particles, likely because the process temperature is less than the melting point of the lignin extract and closer to the material's glass transition temperature using simple pelleting processes. Prior art methods showed some improvement in water resistance, but not sufficient improvement for long-term exterior storage of the final product. Additionally, burning the material at high lignin levels on the surfaces of the wood is problematic because during burning the material melts, sticks together, and stops air flow that is necessary for grilling charcoal.

The presently disclosed inventive concepts do not require carbonization of wood to create a natural charcoal replacement briquette product of sufficiently high BTU, higher water resistance, improved flavor profile, and ability to process into various forms of pellets, briquettes, and shapes without an external binder addition. Rather, standard white hardwood or softwood that is substantially fully impregnated with a monolignol biopolymer is used. The monolignol biopolymer comprises fractionated refined lignin, furfural, acetic acid, and other naturally derived biochemicals.

Figure 1:
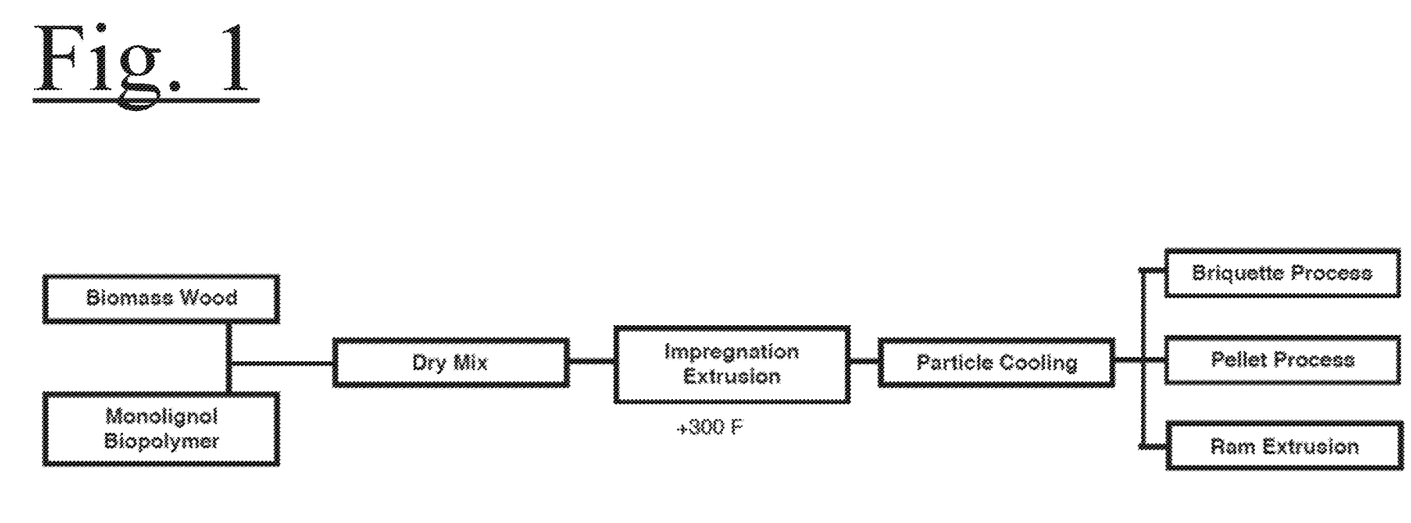
FIG. 1 is a flow chart of the basic process for impregnating wood particles followed by further processing to briquettes, pellets, or various shapes through extrusion processes.

Referring now to FIG. 1, the melt-flowable monolignol biopolymer material can be derived from cellulosic ethanol refining co-product (hybrid organosolv/reactive phase separation process). The monolignol biopolymer and dried biomass or wood particulate are reacted together to form a substantially fully impregnated granular particles with unique properties and functionality. The impregnated granular particles can then be pressed into briquettes, pellets or various shapes with lower moisture content to form high BTU, improved flavor, easier lighting charcoal briquettes and improved water or moisture resistance for grilling and green coal energy applications.

Figure 2:
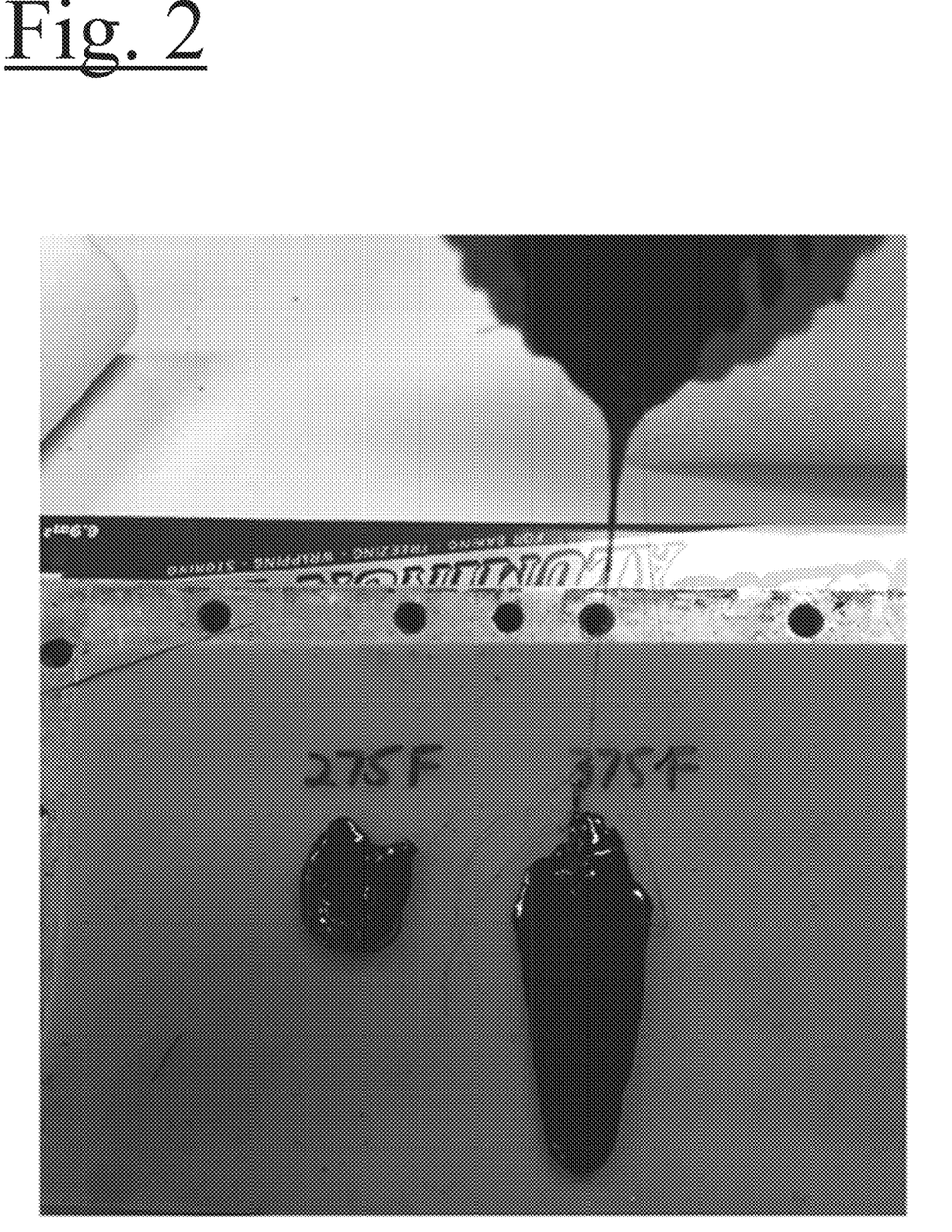
FIG. 2 shows melt flow characteristics of a lignin extract, illustrating temperatures above 375° F. providing flow sufficient for impregnating wood particles.
Figure 5:
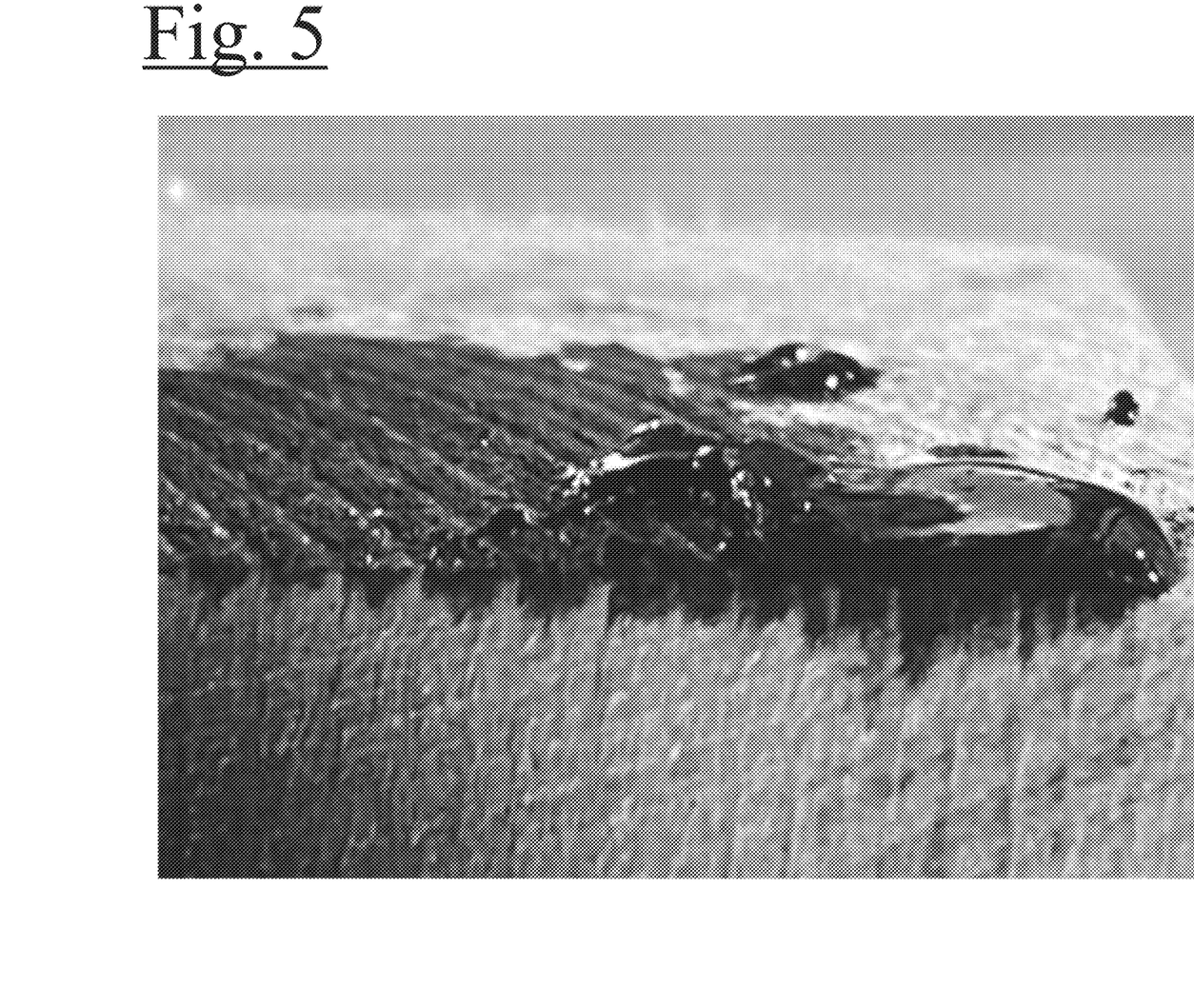
FIG. 5 shows a piece of wood with monolignol biopolymer placed on top, heated to a temperature of 375° F., and then cut to show the level of impregnation into the wood.

The presently disclosed inventive concepts provide a charcoal or coal replacement composition, integrating a monolignol biopolymer and wood particulate in which the wood particles are substantially impregnated with the melt-flowable monolignol biopolymer having a dynamic rheology as demonstrated in FIGS. 2 and 5.

The presently disclosed charcoal or coal replacement composition is void of minerals, coal, and petrochemical binders or petrochemical based solvents to promote lighting of the charcoal briquettes. The novel material provides for higher BTU, improved flavor, easier lighting, reduced moisture or water absorption, and other valuable assets compared to conventional charcoal used in BBQ grilling applications. The novel material is also not limited to grilling. Briquette forms of this material can be used for industrial heating and energy production applications to provide a high BTU biobased fuel that is additionally carbon neutral or carbon negative.

MONOLIGNOL BIOPOLYMERS—Meltable lignin extract can be produced using a hybrid organosolv/reactive phase separation process that fractionates lignin into monolignol forms and reacts lignin with self-generated biochemicals within the hybrid organosolv process, and reacts within the phase separation process to first create the meltable lignin extract material from a separated organic layer.

Various new art and patents teach the hybrid organosolv/reactive phase separation process which takes biomass from trees or agricultural biomass and reacts it with self-generated chemicals produced within the organosolv process. The lignin then reacts with the self-generated biochemicals and also goes through ring-opening polymerization. The resulting material is a black shinny material called lignin extract. Lignin extract can be in the form of a liquid or solid at room temperature.

Melt-flowable lignin extract and process for making as used herein is based on meltable lignin such as, for example, that as described in U.S. Pat. No. 9,365,525 (System and Method for Extraction of Chemicals from Lignocellulosic Materials) and U.S. Pat. No. 9,382,283 (Oxygen Assisted Organosolv Process, System and Method for Delignification of Lignocellulosic Materials and Lignin Recovery), the contents of each being hereby incorporated herein by reference in their entirety.

Monolignol biopolymer as used herein is produced by further high heat processing of the melt-flowable lignin extract by means of, for example, a vented twin screw extrusion in which the material is further reacted, polymerized and devolatilised to provide a higher melting point and appropriate viscosity and melting point above 200° F.

U.S. Patent Publication 2019/0062508A1 (Method for Separating and Recovering Lignin and Meltable Flowable Biolignin Polymers) by this inventor also teaches methods to create a melt-flowable monolignol biopolymer, the publication being incorporated herein by reference in its entirety.

Melt-flowable lignin or monolignol biopolymer material derived from various biomass sources using a hybrid organosolv/reactive phase separation/purification process have unique properties and makeup. Biomass is separated during the reaction and biochemicals are self-generated which further react with the lignin to create the unique melt-flowable lignin. The lignin-based biopolymers have a low viscosity, high melt flow index, higher aliphatic OH groups, and many other advantages including an affinity to couple with and/or impregnate wood. In addition, as shown in FIG. 2, the monolignol biopolymer has a unique rheology whereby it is solid at room temperature, soft at temperatures above 200° F., and a liquid at temperatures greater than 300° to 380° F. This dynamic rheology provides for the ability to impregnate wood (FIG. 5).

Monolignol biopolymers are different and novel as compared to all other lignins available today. Currently kraft lignin is most common, but comprises a very high percentage of sodium hydroxide salts and other hazardous chemicals. In addition, these types of lignin are not good binders nor have the ability to melt. Other lignins such as lignosulfonate provide for binding in aqueous form, but also comprise many hazardous chemicals including but not limited to sulfates, sulfuric acid, and more. All other forms of lignin are irreversibly thermoset by the nature of conventional pulp mills for which lignin and pulp are produced from the trees using many hazardous chemicals.

A key part of this invention is that the lignin in the form of a monolignol biopolymer is melt-flowable with a novel viscosity that when processed at temperatures above 300° F., will substantially fully impregnate wood particles to create improved burning characteristics, improved water resistance, and provide other advantages for charcoal and green coal applications. It is believed that the novel process and composition of the monolignol polymer provides these unique melt-flowable, polar chemical nature, and rheology properties that allow for impregnation of the wood particles. The monolignol composition is fractionated specific molecular weight lignin, furfural, various furans, esters, and acids all from the natural resource of biomass wood. Monolignol biopolymers are produced using 100% biomass without the need for hazardous petrochemicals or processing petrochemicals.

The monolignol biopolymer is not just lignin but fractionated reacted lignin is its primary composition. In addition, the monolignol biopolymer (MLB) further comprises furfural, acetic acid and other self-generated biochemical from the biomass which helps facilitate its ability to be melted at specific temperatures. These additional biochemicals are also commonly found when plain wood is burned within the smoke generated by the wood burning process. Various products such as "Liquid Smoke" also comprise these same natural biochemicals.

Although the preferred embodiment of this invention relates to using a monolignol biopolymer for impregnating wood granules or particles, other forms of melt-flowable purified lignin are included within this invention. The extract or monolignol biopolymer of this disclosure is in contrast to the kraft or sulfite pulping process that removes lignin from the cellulose fibers by treatment with sodium hydroxide, sodium sulfide, or salts of sulfuric acid as a predicate to papermaking. Such lignin is not suitable for the method and pellets or briquettes described herein. This invention also includes the usage of other forms of lignin such as purified kraft, lignosulfonate, organosolv lignin or other lignin, but required to be processed into a melt-flowable form using self-generated biochemical from biomass.

Various other new biorefineries can produce a purer form of lignin without problematic chemicals. Although thermoset, the invention can also include the addition of alcohol and or the addition of self-generated biochemicals to purified lignins to create a melt-flowable lignin extracts.

WOOD FRACTION—The preferred embodiment of this invention provides for impregnated wood particles or biomass particles. Various woods can be used in this invention including all soft and hard woods, although it is more preferred for grilling applications to integrate specific hardwoods. Other biomass material can be used to replace the wood including, but not limited to corn cobs, grasses, nut hulls, rice hulls, and other common forms of biomass or blends thereof. In one example granular wood and corncobs can be blended together prior to impregnation to change the overall flavor of the smoke in grilling applications.

Figure 3:
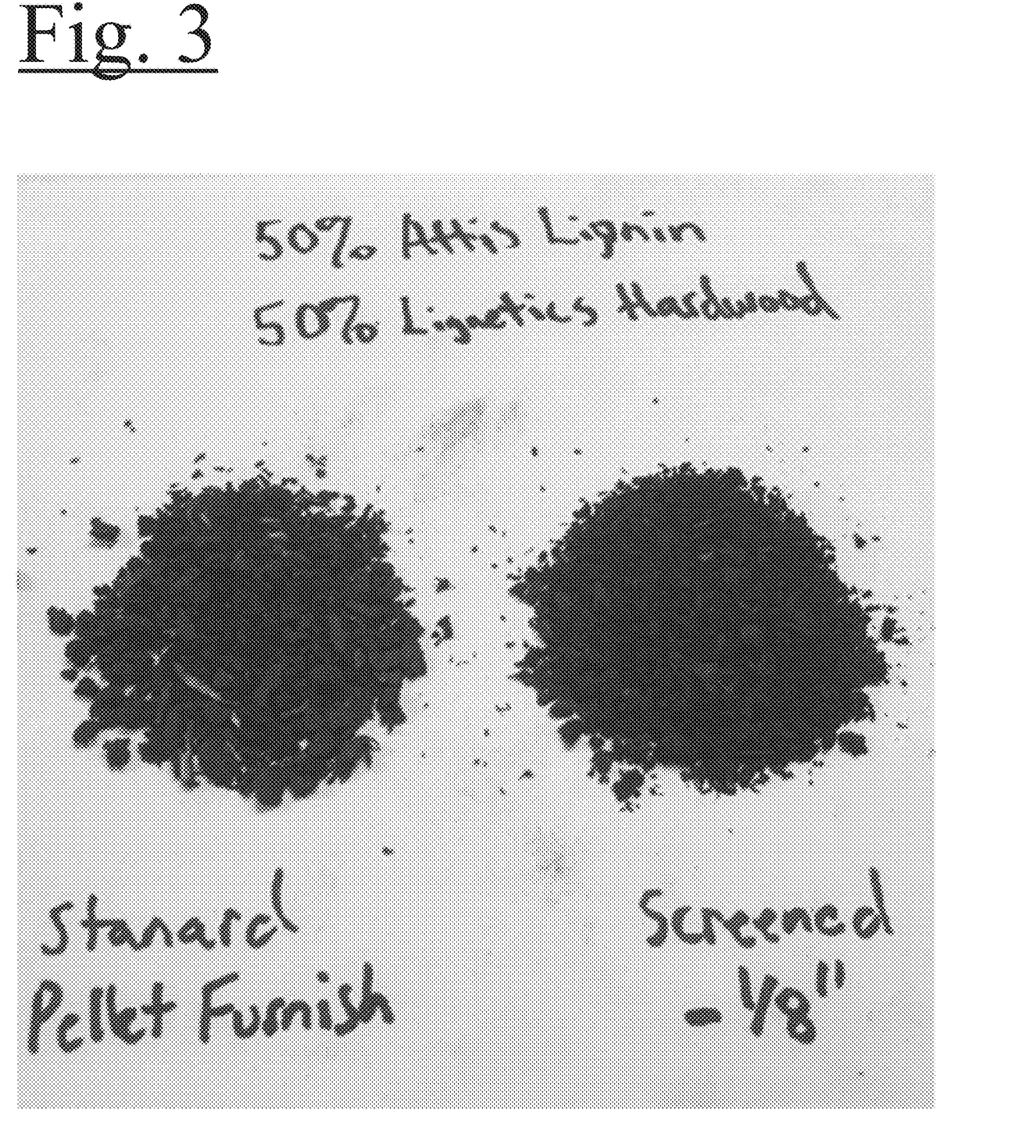
FIG. 3 shows two sizes of white wood particles that have been processed through the impregnation process.

Processed biomass particles as used herein is based on fine grinds of various biomass including, but not limited to trees, wood, bark, agricultural residues, seed hulls, food processing byproducts or blends thereof which are subjected to heat and ground into a particulate material to a fine flour, powder or granular between ¼" to 500 mesh and more preferably between 4 mesh to 60 mesh. For the specific application of grilling charcoal, a blend or specific species of hardwood and mesh size is preferred typically less than ⅛" mesh size as shown in FIG. 3.

The wood particulate is dried to moisture content typically below that of 10% and preferably below 8%. Drying processes of wood particles are well known IMPREGNATION PROCESS AND IMPREGNATED GRANULES—A key within this invention is the unique rheology and viscosity of the monolignol biopolymer being solid at room temperature and melting point starting around 200° F. The viscosity continues to thin significantly at temperatures over 300° to 400° F., thus providing sufficiently low viscosity to allow for the impregnation process.

In the conventional production of various solid energy fuel pellets or briquettes process temperatures are reasonably low ranging from about 100° F. to 200° F. created from the frictional pressures within the process or steam pretreatments. This does not allow for the correct viscosity to impregnate the wood particles, but may be sufficient to bind particles of wood together. In one prior art example, approximately 50% wood and 50% monolignol biopolymer in which the monolignol biopolymer has a melting point slightly above these normal pelleting or briquette processing temperatures. Processing at these temperatures softens the monolignol biopolymer, but only coats the particles creating a non-homogenous material. This can be problematic in higher loading applications using conventional pelleting or briquetting processes wherein the wood particles coated with MLB can melt and stick together during burning and stop necessary air flow. This is obviously problematic and not acceptable in various grilling or solid fuel energy boilers.

The presently disclosed inventive process substantially fully impregnates wood particles by means of high heat and slight pressure/mixing wherein the process temperature is above 300° F. or above 350° F., or above 380° F. Although it may be helpful to reach processing temperatures above 400° F., this can quickly thermoset the monolignol biopolymer and start wood degradation. At these processing temperatures, the MLB viscosity significantly lowers approaching the viscosity of water or thin oils. At these viscosities and under mixing or pressurized mixing, the low viscosity molten liquid easily impregnates the wood particles. Once impregnated, the "composite" particles have a very different melting point, reduced stickiness, greatly improved water resistance, more uniform burning function, and dust is removed resulting in surprisingly uniform particle distribution.

These impregnated granular particles are first produced by integrating the monolignol biopolymer, in a fine granular or powder form, that is dry blended with wood sawdust or wood flour. Various ratios are included within this invention. In one non-limiting example, blend of approximately 50/50 wood to monolignol biopolymer is used.

The dry blend is then run through a heat mixing process wherein the monolignol biopolymer is melted to a low viscosity which allows for substantially full impregnations of the wood particles to form a granular material called fused particulate granules.

The process requires running at temperatures greater than the melting point of the monolignol biopolymer, typically above 200° F. and more preferably above 350° F. to decrease its viscosity and thereby provide impregnation. The particles can be made with heated extrusion equipment, plastic compounding equipment, twin screw sludge drying equipment or other various heated mixing equipment that provide sufficient heat, mixing and a kneading action.

The impregnation process can be performed using various processing equipment. In one method the wood particulate and ground MLB material are processed through a twin-screw extruder using heat and minimal pressure to impregnate the wood particles. This can be done, for example, using a vented twin-screw compounder by removing the die section so as to allow for free flow and minimal pressure within the system. The twin-screw process also integrates a slight kneading action to assist in the impregnation of the wood particles. As understood by those skilled in the art, other processes of heating and mixing can be utilized.

The MLB Impregnated Wood Particles (IWP) can then be cooled down and stored more easily with very minimal dust. The fused MLB impregnated wood particulate has a higher bulk density than wood and does not contain any dust that could be airborne. In addition, it also has significantly improved moisture resistance and higher BTU/lb energy. In one example a blend of 50% MLB to 50% wood particulate that has been impregnated has an approximate energy level over 10,000 BTU/lb.

Although one preferred embodiment is a ratio of MLB to dried wood of 50/50, the invention includes adjustment of this ratio to meet specific product requirements. For example, ranges of MLB loading can be between 10% to 90%. In one embodiment, MLB loading ranged from 30-70%. In another embodiment, MLB loading is in a range of 40-60%.

The impregnated wood particles can then be further processed into various forms including but not limited to pellets using standard wood pelleting processes and temperatures, briquettes using standard briquette processes and equipment and other shapes included extruded shapes without the usage of a binder. Various shaped products include, but not limited to, fire logs, pucks, molded shapes, donut shapes and other shaped product. The impregnated wood particles fuse together in a more homogenous form in these processes thus providing many advantages and meeting the needs for charcoal based solid fuels. One major advantage of this invention is that conventional pellet, briquetting, or extrusion processes can be used without the addition of water and at normal operation parameters.

The impregnation processes and resulting impregnated wood particles compressed shapes disclosed within this invention also has other significant advantages including vastly improved water resistance, improved density, higher energy, and other novel properties than wood or charcoal. This is important for a number of reasons. In shipping and storing wood pellets for solid fuel energy application, many large coal fired power plants only store coal outside, thus do not have sufficient inside storage facilities that wood pellets require. Current charcoal or wood based solid fuel products also have an infinity to absorb moisture in the air and water. This also can lead to leaching and water run off problems during storage. This is problematic for people that grill and store their charcoal or solid energy biomass materials outside CHARCOAL PROCESSING—Conventional charcoal is a briquette compressed with a higher moisture content to allow for the binders to work. Typically charcoal comprises relatively dry particulate materials in which the moisture content is increased by the addition of water to over 35% to allow the cornstarch, lime and borax binder to activate. After briquetting this moisture only drops slightly to around 30-35%, at this point the briquettes are soft and easily damaged or broken. Then the soft briquettes are dried to a final moisture content below 5% requiring significant energy, complex equipment, time and cost. This also reduces the specific gravity of the conventional charcoal, thus lowering is volumetric energy.

Advantageously, the present inventive process requires no water addition or a high starting moisture content. The MLB material is highly hydrophobic and has a moisture content typically below 1.5%. Within the impregnation fusion process, wood and MLB are blended at high temperatures that not only greatly reduces the overall viscosity of the MLB but also provides a method that dries the wood from the starting 8% to less than 4%.

Figure 4:
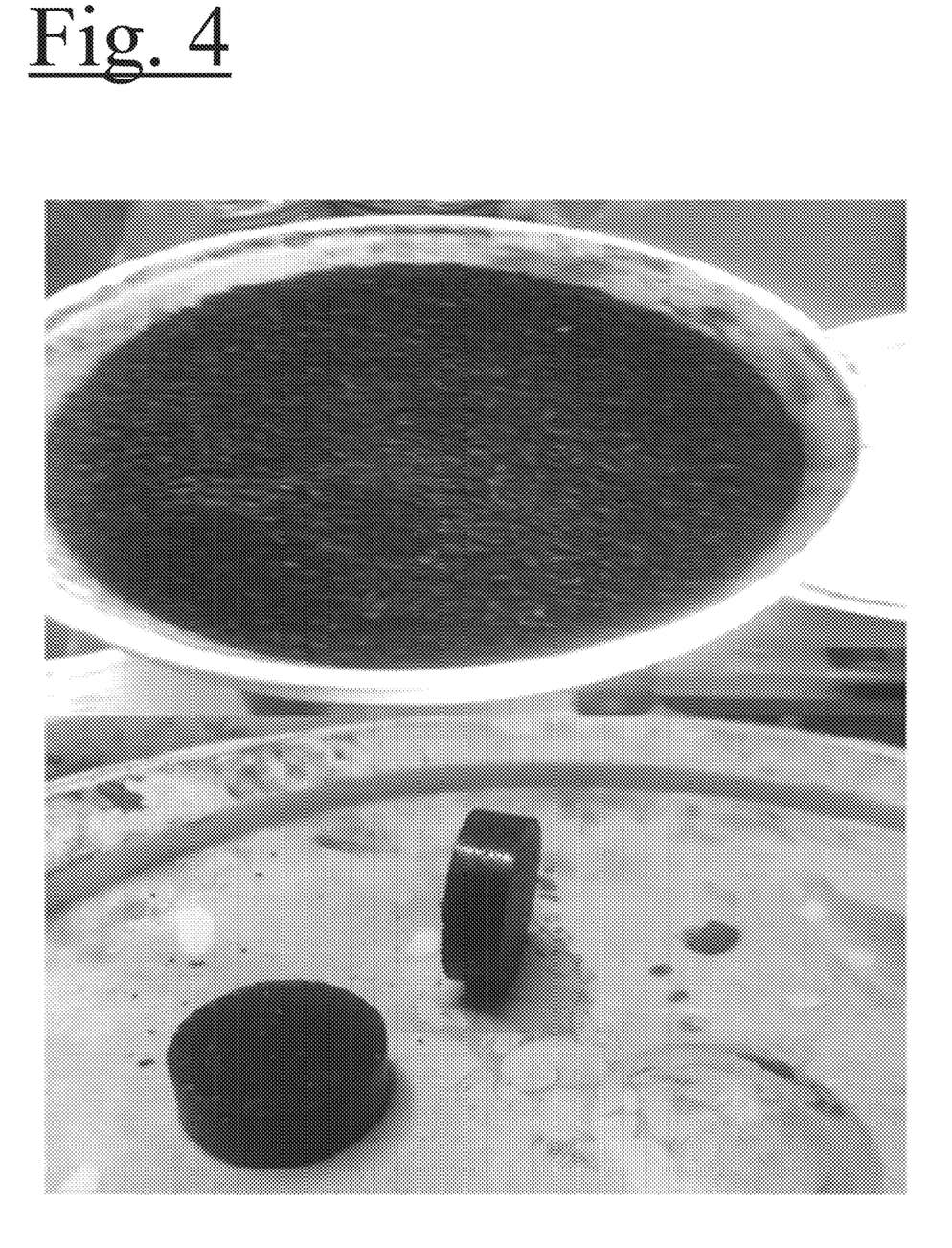
FIG. 4 shows the impregnated particles and two samples that have been pressed using basic briquetting processing parameters.

After both the impregnation process and compression process into pellets, briquettes or shapes, as shown in FIG. 4, the resulting product has a moisture content of typically less than 2% given the vented impregnation process at these heat levels further reduce the moisture content of the impregnated particles and the heat of pelleting or briquetting further reduce the overall moisture content. This provides for higher energy/lb, higher density of final product and other advantages over conventional wet briquette processing. The invention allows for this lower cost and more efficient dry processing into final shaped articles.

Conventional charcoal is a relatively homogenous material that is designed specifically for grilling, allowing for specific burning properties, ability to glow, and ability to not melt or fuse together during burning. Coated wood or wood does not provide sufficient heat energy nor the ability to maintain heat for sufficient times. Using a melt-flowable lignin extract as a binder coating for wood does not provide for the required homogeneity of the compressed product and surfaces can re-melt fusing the briquettes or pellets together, thereby creating air flow problems and not allowing for the sufficient glowing infrared energy output. However, by impregnating the monolignol biopolymer or forms of melt-flowable lignin extract at high temperatures, these materials saturate both the cellular structure and intercellular structure of the wood particle (see FIG. 5) to create more uniform burning, glowing, and does not re-melt fusing particles together which is critical for these applications.

GRILLING PERFORMANCE—Although the invention can be used for green coal and other solid fuel applications desiring carbon neutral fuels, one of the primary applications for this invention is as a replacement for conventional charcoal used in grilling.

Conventional charcoal typically comprises carbonized wood, coal, borax, lime, cornstarch and other materials. The invention disclosed does not require any of these components and creates a 100% natural wood derived material for grilling with the ability to adjust the favor profile of the smoke produced for grilling or BBQ. The invention can replace either conventional charcoal briquettes or provide for a better, improved smokey flavored wood pellet for pellet grilling.

Cooking with real wood pellets creates a wide range of chemicals within the smoke to create the flavor in meat during grilling. In addition, the smoke is antimicrobial wherein smoked meats can last for longer periods of time. Various chemicals come from wood smoke, although by differing percentages based on the type of wood, the basic compounds are similar comprising: phenols, furfural, aldehydes/keytones, carbonyls, organic acids and other compounds.

Conventional charcoal such as name brand products like Kingsford, use carbonized wood, anthracite coal, cornstarch, borax, and lime as the primary recipe components. The carbonized wood and coal provide a more conventional charcoal flavor. Most charcoal smoke chemical makeups consist of similar nature to that of wood, but higher levels of phenols, furans.

Within charcoal smoke there were 255 compounds found in preheating smoke, including phenol derivatives (34 compounds, 36.55%), aromatic hydrocarbons (69 compounds, 18.95%), furans (31 compounds, 18.66%), ketones (28 compounds, 8.09%), nitrogen containing compounds (30 compounds, 5.11%), aliphatic hydrocarbons (23 compounds, 3.63%) and other compounds (40 compounds, 9.01%) e.g., aldehyde, acid, and ester, respectively. Conventional charcoal contains sulfur that is problematic.

The recent trend in grilling and in green energy is to remove coal from such products. This invention removes both the carbonized wood and coal portions of charcoal or green "black" energy pellets in which white wood is impregnated with an all-natural dynamic rheology monolignol polymeric material. This first removes the need to carbonize, pyrolyze or torrefaction processes which requires significant energy and high very high yield losses. This also removes the need for the addition of petrochemical coal.

In cooking with wood, various wood species has different flavors and smokiness that transfers to the grilled food. Apple wood is known for its softer milder smokiness wherein woods like mesquite wood have a more prominently smoky flavor. This due to the fact that mesquite has a significantly higher percentage of natural lignin typically 45% or higher. Other hard wood, like apple wood, typically are lower than 30% lignin. Thus, the type and amount of lignin within natural wood creates various flavor profiles. In burning wood with various amounts of lignin, the natural smoke from wood comprises many chemicals including phenols, furans, acetic acid, esters, and many more biochemicals.

Monolignol Biopolymers (MLB) is typically made from hardwood trees and comprises approximately 90% pure lignin and other biochemicals derived from the wood such as furans, acetic acid, sugars and esters from hemicellulose fractions. Thus, within the invention the percentage of MLB added to the wood particles provide for a method to create specific smoke flavor levels within the final pellet, briquette or shape.

It is well known that, in order to ignite charcoal in a standard charcoal cooker, a substantial amount of heat must be applied to the charcoal; substantially more heat than is generated by a match. Typically, charcoal is ignited by the use of an electric starter or by the application of a lighter fluid. Since the use of lighter fluid is the most common means of igniting conventional charcoal, the use of lighter fluid will be described herein with the understanding that similar discussion of other means of igniting conventional charcoal applies.

The invention also provides for improved ignition of the charcoal with lower energy inputs required even to the point where a lighter fluid may not be required. Lighter fluid can create a "petrochemical taste" to your food if not fully burned or leave a chemical residue within your grill. If too much lighter fluid is used, then cooking of food may be delayed to allow for burning off of the excess lighter fluid before cooking of food is begun. It is not particularly desirable to cook food before the lighter fluid has been all consumed, as the lighter fluid itself, and the fumes from burning it, are not particularly advantageous for use in cooking food The invention ability to impregnate MLB into various types of hardwood particles and form various shapes including but not limited to pellets, briquettes, and specific shapes now allows the ability to engineer various BTU levels, degrees of water resistance and more so customized smoke flavors to either mimic current hard woods like mesquite or other levels of smoky flavors.

EXPERIMENTS AND EXAMPLES

The compositions and data used in this example describe specific embodiments of the compositions of the present invention, but are not intended to be limiting thereof, Other modifications can be undertaken by the skilled artisan without departing from the spirit and scope of this invention. For example, the briquettes in the examples are formed into pillow shapes, but the invention is suitable for other briquette shapes as well.

All exemplified compositions can be prepared by conventional formulation and mixing techniques. Component amounts listed in percentage ("%'s") are in weight percent of the composition alone and exclude minor materials such as fillers, etc., typically used to modify the compositions characteristics Experiment 1

Hardwood particles of less that pass through a 14" screen and dried to approximately 5-7% moisture content where acquired. The monolignol biopolymer was made using a hybrid organosolv/reactive phase separation process. The MLB was in a solid form and ground into a fine particulate to powder state.

We dry blended both materials at a 50/50 ratio and then compressed under heat and pressure similar to heat and pressures used in pelleting, briquetting or composite pressing (200° F. and over 500 psi). Although the material fused together, the material was sticky and created issues sticking to the die and releasing. The samples where then tested for burning by placing on a screen with a flame underneath to ignite the sample pieces. The material did bubble and melted to form a solid material in which the air could not pass through the sample and created non-uniform burning. The material did not "glow" after the fire was reduced or stopped. Extra pieces were then soaked in water for 5 minutes in which the sample pieces took on over 12% water. In 24 hours, the material gained over 30% water by weight.

Experiment 2

The same hardwood particles from Experiment I were blended with MLB at the same 50/50 ratio. The material was then run through a twin screw extruder without a die face, thus no die pressure was provided to the material, but a simple heat mixing process. The temperature was raised to 380° F. and took about 2 minutes to get through the extruder. To our surprise the material came out of the extruder end in a granular form. In examining the particles by cutting them, we could see that the MLB material soaked into the wood particles. These particles where then compression molded using the same methods in Experiment I. The samples were submitted for burning and water-resistant testing. In burning, we did not see the bubbling of the MLB and the material did not melt into a solid form, but retained its shapes. The material ignited quickly, flamed then went into a glowing state looking surprisingly similar to charcoal. The balance of samples where then placed into water for 5 minutes and absorbed less than 0.5% water and after 24-hour water soaked absorbed less than 1%. Thus, there is significant potential for exterior storage of this material.

Experiment 3

The MLB material was then further evaluated by melting and viscosity testing to better understand the impregnation of the wood particles. MLB in a granular form used in the above experiments were placed on a silicon baking sheet in a pile of about 50 g. Multiple samples were prepared. The first test placed one sample in an oven at a temperature of 230° F. which is approximately the maximum temperature seen in pelleting or briquetting processes. The material did melt but not fully and was very high viscosity. At this temperature the material was more like a soft rubber. The silicon sheet was then angled at about 45 degrees and the material stayed exactly in its place and did not deform or flow. The second sample was placed in the oven at 380° F. for the same period of time. The MLB melted quickly and has a very low viscosity such that when we angled the silicon sheet at this temperature, the material ran off of the silicon sheet.

Experiment 4

A wood sample was prepared from a piece of lumber in which we cut a small slice from the end and placed with the end grain upwards. Two pieces were prepared with the same amount of MLB in a small pile on top of the end grain. Sample I was placed in an oven at 230° F. and the second in the oven at 375° F. After 15 minutes in the oven, both samples were removed and cut as to see the profile and potential impregnation level. The lower temperature did not flow and had a depth of end grain impregnation of less than 0.010 inch. The higher temperature processed sample at 375° F. was measured for impregnation in which most of the area showed impregnation depth greater than 0.100 inch or 10 times greater. Both samples did not use additional pressure.

Experiment 5

Wood sawdust was pelletized using a standard wood pelleting system in which 50% MLB was dry blended prior to the pelleting process. A second sample was prepared wherein the MLB impregnated wood particles at the same loading were pressed and granulated into a similar size as the wood pellets. A ¼ cup of each sample were placed on a screen and a torch was used beneath the piles to ignite the materials. It was quickly apparent that the pelleted material "bubbled" and showed quick signs of melting. The pile quickly was glued together into a mass and air between the particles was shut off, thus the flame started to go out. The second sample of the impregnated granular did not bubble or show signs of melt sticking remaining as individual particles maintaining good air flow. The pile then started to glow similar to that of charcoal.

Experiment 6

A dry blend of 50% ground MLB and 50% pine sawdust were created and separated into two samples. Sample I was placed in a compression molding machine at a temperature of 220 degrees to simulate processing temperatures of pelleting and briquetting. The sample was then cooled. The second sample was run through a twin screw compounder at a temperature of 380° F. to impregnate the wood particles. After cooling the particles, the particles where then pressed under the same conditions as the first sample. Both sample pieces where then sanded and cut open. In the first sample, it is very apparent that much of the wood particles were exposed and only coated. The second sample of the impregnated particles was almost pure black on the inside and sanded surface with only a very few small wood color pieces could be observed.

Experiment 7

A blend of 50% dried pine saw dust and 50% MLB were dry blended and run through an extruder at a temperature greater than 350° F. and pellets were cut from the strand. A longer strand was held in the air and ignited using a common lighter at one end. It very quickly ignited and burning seems to accelerate.

Experiment 8

A 50% blend of dried hard wood and 50% MLB were first dry blended then run through a twin screw extruder without a die plate. The material came out in granular form and was cooled. The material was then loaded into a tablet press under high pressure creating a shiny smooth dust free cylindrical shape. The same material was then run through a rotary briquette press in which the briquettes had a shiny surface and very high integrity greater than conventional charcoal. In addition, we observed that there was no dust on the surface of the briquette which had a sealed shinny surface.

Experiment 9

A sample of the MLB material was tested for its energy content in BTU/lb equating to an energy level greater than 12,000 BTU/lb. A sample of 50% MLB with 50% wood was tested by an independent testing lab showing an energy level greater than 10,000 BTU/lb.

Various modifications and variations can be made in the present invention without departing from the spirit or scope of the invention. From the foregoing, it will be seen that this invention is one well adapted to obtain all the ends and objects herein set forth, together with other advantages which are obvious and which are inherent to the structure. It will be understood that certain features and sub combinations are of utility and may be employed without reference to other features and sub combinations. This is contemplated by and is within the scope of the claims. As many possible embodiments may be made of the invention without departing from the scope thereof, it is to be understood that all matter herein set forth or shown in the accompanying drawings is to be interpreted as illustrative and not in a limiting sense.

Thus, in accordance with the presently disclosed inventive concept(s), there have been provided a wood particulate substantially fully impregnated with a melt-flowable lignin extract, as well as methods of making the same and products utilizing the same, that fully satisfy the advantages set forth herein above. Although the presently disclosed inventive concept(s) has been described in conjunction with the specific language set forth herein above, it is evident that many alternatives, modifications, and variations will be apparent to those skilled in the art. Accordingly, it is intended to embrace all such alternatives, modifications, and variations that fall within the spirit and broad scope of the presently disclosed inventive concept(s). Changes may be made in the construction and the operation of the various components, elements, and assemblies described herein, as well as in the steps or the sequence of steps of the methods described herein, without departing from the spirit and scope of the presently disclosed inventive concept(s).

What is claimed is:

1. An impregnated material comprising:
   wood particulate; and
   a melt-flowable lignin extract comprising a monolignol biopolymer,
   wherein the melt-flowable lignin extract substantially fully impregnates the wood particulate.

2. The impregnated material of claim 1, wherein the melt-flowable lignin extract further comprises an all-natural fractionated lignin, furfural derivatives, alcohol, esters, acetic acid or combinations thereof.

3. The impregnated material of claim 1, wherein the monolignol biopolymer is produced solely from biomass using a hybrid organosolv/reactive phase separation process.

4. The impregnated material of claim 1, wherein the wood particulate has a particle size in a range from about ¼ inch to a fine wood flour less than 60 mesh.

5. The impregnated material of claim 1, wherein the monolignol biopolymer is solid at room temperature and has a melting point above 180° F.

6. The impregnated material of claim 1, wherein the melt-flowable lignin extract has a viscosity sufficient to impregnate the wood particulate.

7. A charcoal replacement fuel, comprising the impregnated material of claim 1 compressed into a shaped article.

8. The charcoal replacement fuel of claim 7, wherein the shaped article is an extruded or molded briquette or pellet.

9. The charcoal replacement fuel of claim 8, wherein the briquette or pellet has about 10,000 BTU/lb energy and less than 10% water absorption after twenty-four hours.

10. The charcoal replacement fuel of claim 8, comprising greater than 25% melt-flowable lignin extract.

11. The charcoal replacement fuel of claim 8, wherein the melt-flowable monolignol biopolymer comprises an all-natural fractionated lignin.

12. The charcoal replacement fuel of claim 8, wherein the melt flowable monolignol biopolymer comprises fractionated lignin, furfural, and acetic acid.

13. The charcoal replacement fuel of claim 8, further comprising an alcohol selected from butanol, ethanol, and combinations thereof.

14. The charcoal replacement fuel of claim 8, wherein the wood particulate comprises a white hard wood or soft wood particulate.

15. The charcoal replacement fuel of claim 8, wherein the charcoal replacement fuel contains no carbonized wood, coal, or binder.

16. A solid energy fuel comprising; a monolignol biopolymer and white wood particulate, wherein the white wood particulate is substantially fully impregnated with the monolignol biopolymer.

17. The solid energy fuel of claim 16, wherein the impregnated wood particulate is granular.

18. The solid energy fuel of claim 16, wherein impregnated wood particulate is compressed into a pellet, briquette or other-shaped article.

19. The solid energy fuel of claim 16, wherein the solid energy fuel has a BTU/lb energy and density greater than wood.

20. The solid energy fuel of claim 16, wherein monolignol biopolymer comprises melt-flowable lignin extract.

21. The solid energy fuel of claim 16, wherein the water absorption is less than 10%.

22. An improved charcoal comprising:
   wood particles substantially fully impregnated with a monolignol biopolymer, the impregnated wood particles blended with a conventional charcoal material comprising carbonized wood, or coal, or combinations of carbonized wood and coal.

23. The improved charcoal of claim 22, comprising essentially no lime or borax.

24. The improved charcoal of claim 22, wherein the wood particles substantially fully impregnated with a monolignol biopolymer comprise 1% to 50% of the conventional charcoal material.

25. The impregnated material of claim 1, wherein the melt-flowable lignin extract further comprises butyl acetate.

\* \* \* \* \*